United States Patent [19]

Ault et al.

[11] Patent Number: 5,764,889

[45] Date of Patent: Jun. 9, 1998

[54] METHOD AND APPARATUS FOR CREATING A SECURITY ENVIRONMENT FOR A USER TASK IN A CLIENT/SERVER SYSTEM

[75] Inventors: Donald Fred Ault, Hyde Park; Ernest Scott Bender, Saugerties; Michael Gary Spiegel, Monroe, all of N.Y.

[73] Assignee: International Business Machines Corporation, Armonk, N.Y.

[21] Appl. No.: 721,145

[22] Filed: Sep. 26, 1996

[51] Int. Cl.$^6$ .............................. G06F 13/00; H04L 9/00
[52] U.S. Cl. ................ 395/186; 395/187.01; 395/200.01
[58] Field of Search ........................ 395/186, 187.01, 395/200.01, 680; 380/21

[56] References Cited

U.S. PATENT DOCUMENTS

| | | | |
|---|---|---|---|
| 4,503,499 | 3/1985 | Mason et al. | 395/671 |
| 4,584,639 | 4/1986 | Hardy | 395/186 |
| 5,032,979 | 7/1991 | Hecht et al. | 395/187.01 |
| 5,220,668 | 6/1993 | Bullis | 395/672 |
| 5,359,721 | 10/1994 | Kempf et al. | 395/685 |
| 5,361,359 | 11/1994 | Tajalli et al. | 395/186 |
| 5,381,534 | 1/1995 | Shi | 395/200.33 |
| 5,553,242 | 9/1996 | Russell et al. | 395/200.12 |

OTHER PUBLICATIONS

"UNIX Network Programming" by W. R. Stevens, pp. 10–38, 55–59, & 334–339, PTR Prentice–Hall Inc., 1990.

"Modern Operating Systems" by A. S. Tanenbaum, pp. 14–16, 279–284 & 293–297, Prentice–Hall Inc., 1992.

"Grouping User Logons to a Multitasking Address Space" by D. F. Ault et al., IBM Technical Disclosure Bulletin, vol. 39 No. 7 Jul. 1996.

"Fork Clone Address Space Implementation On MVS" by D. F. Ault, IBM Technical Disclosure Bulletin, vol. 35 No. 6 Nov. 1992.

"Interoperability Between MVS and POSIX Functions" by D. F. Ault, IBM Technical Disclosure Bulletin, vol. 35 No. 6 Nov. 1992.

"Method and Apparatus for Controlling Server Access to a Resource in a Client/Server System" by D. F. Ault et al., U.S. Application Ser. No. 08/632,251, Filed Apr. 15, 1996.

*Primary Examiner*—Robert W. Beausoliel, Jr.
*Assistant Examiner*—Ly V. Hua
*Attorney, Agent, or Firm*—W. A. Kinnaman, Jr.

[57] ABSTRACT

A method and apparatus for enabling a listening daemon in a client/server system to execute a specified task on behalf of a user. Upon receiving a user request, the listening daemon sets an environment variable in accordance with the user identity specified in the request and issues a system call to the operating system kernel to spawn the user task specified in the request. In response to the system call, the operating system kernel creates a new address space for the specified user task and creates a security environment for the user task in accordance with the environment variable before starting the user task in the new address space.

24 Claims, 2 Drawing Sheets

METHOD AND APPARATUS FOR CREATING A SECURITY ENVIRONMENT FOR A USER TASK IN A CLIENT/SERVER SYSTEM

BACKGROUND OF THE INVENTION

1. Field of the Invention

This invention relates to a method of creating a new unit of work in a POSIX environment with a new user identity and appropriate privileges.

2. Description of the Related Art

Distributed computing systems (in which the work is distributed among a plurality of interconnected machines) are often built on a client/server model. In this model, a client process (or simply "client") issues a request to a server process (or simply "server") to perform a specified service, such as printing a file in the case of a print server, retrieving or storing a file in the case of a file server, or executing an application in the case of an application server. Although a client process and a server process may reside on the same physical machine, typically, and in the description that follows, they reside on different machines. Among other environments, servers are used in local area networks (LANs), as well as in such wider networks as the Internet. One class of Internet servers of special interest herein are those that service the World Wide Web, a collection of Internet sites that provide graphical content ("Web pages") and perform other services in accordance with the Hypertext Transfer Protocol (HTTP).

Servers such as those on the World Wide Web (or just "Web") work in conjunction with operating systems, which manage system resources and perform basic system services on the machines on which the servers reside. Often, these operating systems are UNIX operating systems or UNIX-based operating systems. Because of the proliferation of different UNIX operating systems, various efforts have been made to define a common set of services provided by such systems. One such effort is the IEEE POSIX 1003.1 specification, first promulgated in 1988, as well as such addenda as IEEE POSIX 1003.1d (hereinafter collectively referred to as "POSIX").

Access by user processes to files and the like is controlled in POSIX-compliant systems by associating a user ID and group ID specifying a user identity with each process as well as with each file. Also associated with each file are three three-bit fields, each of consists of three permission bits known as rwx bits. The three fields respectively define the access permitted to the owner of the file, to other users in the owner's group, and to other users that are not in the owner's group. Within each three-bit field, the r bit specifies whether a file may be read, the w bit specifies whether a file may be written to, and the x bit specifies whether a file may be executed. Whenever a process requests access to a file, the user ID and group ID of the process and file, as well as the permission bits specified for the file, are examined to determine whether the user executing the process can make the requested access. This access control procedure is well known in the art and is described in such references as W. R. Stevens, *UNIX Network Programming* (1990), and A. S. Tanenbaum, *Modern Operating Systems* (1992), incorporated herein by reference.

To provide such access control in a server environment, POSIX-compliant operating systems must support the ability of the server to create a new unit of work with a new user identity, as well as a new security environment in which the new unit of work has access to a different set of resources. This type of work is conventionally performed in server systems by background programs called "daemons". Typically, a daemon will handle a request to perform a task on behalf of a user that has a subset of the authority of the daemon. In order to maintain system security, the task must be performed under a new unit of work with the user's authority. The creation of these new units of work is handled through functions such as fork(), setuid(), setgid(), exec() and other related POSIX services.

An example of a daemon is a Web server on a POSIX system. Such a Web server is a program that listens on a port for a user to submit a request to retrieve a document from a POSIX file system. In order to do this the Web server must first verify the user name and password. The Web server then uses the fork() function to create a new address space to provide a separate environment for the requested user task. Once in the new address space, the Web server must create the correct security environment by using various POSIX functions such as getgroups() and setgroups() to establish the correct supplemental group IDs, followed by a setgid() and setuid() to establish the correct group IDs and user IDs. Supplemental groups, group IDs and user IDs make up the basis for POSIX permissions. Lastly, the Web server does an exec() of the shell to run a shell script which acquires the requested document. Overall, this is a long and complicated process requiring a great deal of processing overhead.

The spawn() service is a POSIX function (documented in IEEE POSIX 1003.1d) that combines the fork() and exec() services into one call. So instead of forking a new address space and then execing a new program image, a POSIX application can simply spawn the new program into a different address space and save the overhead of copying the requester's address space. The problem here, however, is that there is currently no way to change the user identity before the new program image gets control without changing the security environment of the daemon itself. Thus, if a daemon were to attempt to spawn the shell script to acquire the requested document, the access to the POSIX file system would occur under the daemon's user identity, which could supersede POSIX permissions for the user requesting the document. With the inability to use spawn(), the daemon application must provide additional cumbersome software to run in the user task process layer, as described above.

SUMMARY OF THE INVENTION

In general, the present invention relates to a method and apparatus for executing a task on behalf of a user with an appropriate security environment for the user in a server system in which a daemon process listens for a request from the user to execute a specified user task. Upon receiving a request from the user, the daemon process sets an environment variable in accordance with the user identity (e.g., user name) specified in the request, and issues a system call to the operating system kernel to execute the specified user task in a new address space. The operating system kernel may be a POSIX-compliant kernel, in which case the system call may be a spawn() system call. Upon receiving the system call from the daemon process, the operating system kernel, creates a new address space for the specified user task, creates a security environment for the specified user task in accordance with the environment variable, and starts the specified user task in the new address space.

More particularly, in accordance with the present invention, the above deficiencies of the prior art are resolved by creating a new environment variable (USERNAME) that when specified causes a program that is invoked by the spawn() function to get control with the correct POSIX permissions. To accomplish this, the spawn() function is changed so that it recognizes the new environment variable and, after verifying that it is a valid user name, causes the initial creation of the new address space to be done for the specified user name. Once running with the new user identity, the remaining POSIX permissions are obtained from the user's entry in the security data base. With the new address space and task initialization complete, the spawn routine then starts the new program image in the correct security environment.

The present invention provides a method of creating a security environment for a user task process without any required changes to the daemon process environment. In addition, there is no need for any portion of the daemon application to run in the user task process, where it would be necessary to change the user task process permissions before giving control to the user task program image. The present invention also allows for the use of the spawn() function to replace the conventional usage of fork() and exec(), thereby gaining the simplification and performance enhancements inherently provided by the spawn() function.

DESCRIPTION OF THE PREFERRED EMBODIMENT

Figure 1:
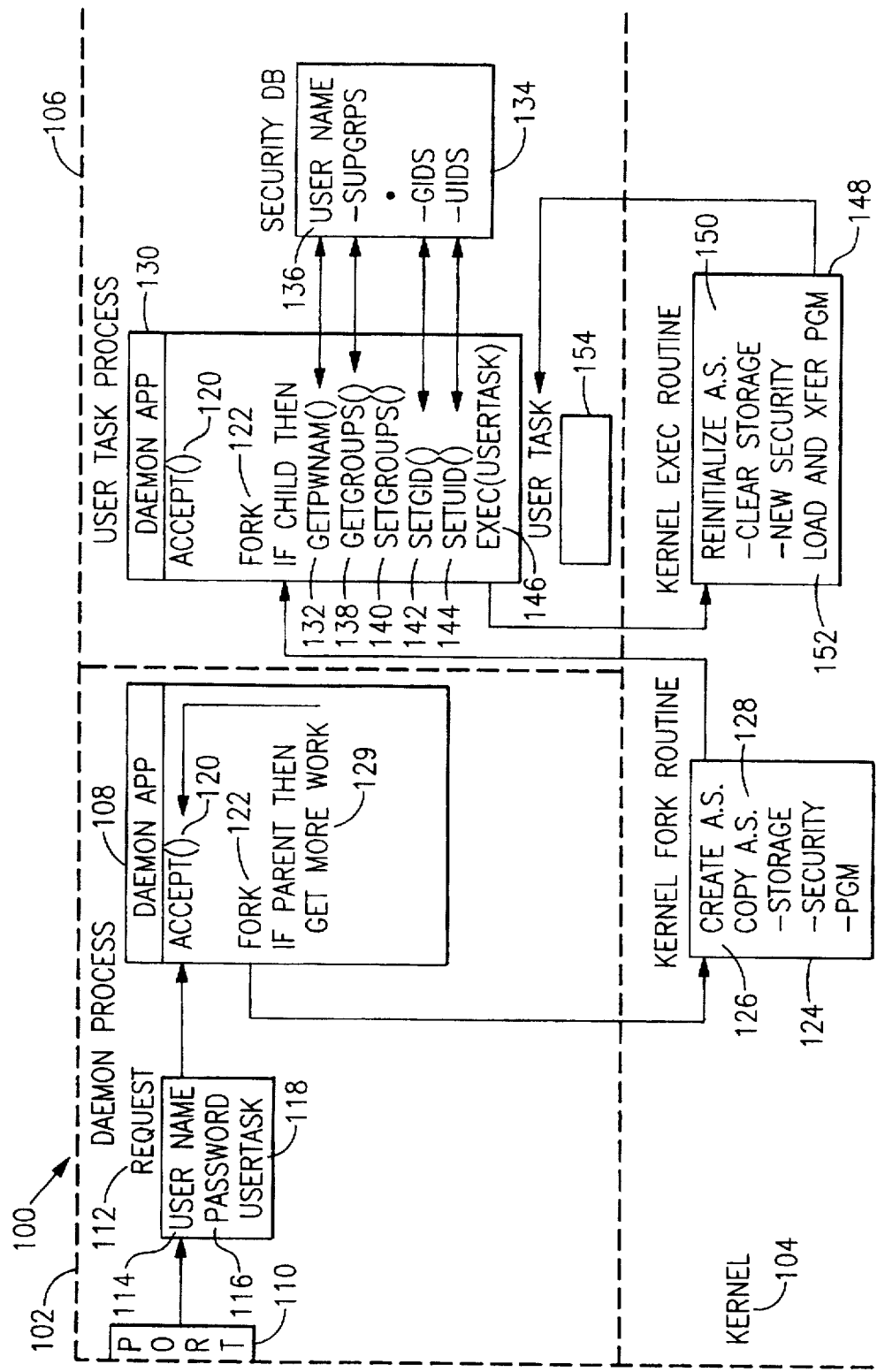
FIG. 1 shows a computer system incorporating a conventional implementation for creating a security environment for a user-requested task.

FIG. 1 is an example of a computer system 100 (comprising a physical machine) incorporating a conventional implementation of a daemon, showing the relationship between the various software layers for performing a requested task for a specific user. These layers include a daemon process layer or address space 102, an operating system (OS) or kernel layer or address space 104, and a user task process layer or address space 106 that is created in the manner described below. The physical machine may be an IBM S/390 processor such as the S/390 Parallel Enterprise Server, while the kernel layer 104 may be the IBM OS/390 operating system with its POSIX-compliant OpenEdition component.

In the daemon process layer 102 is a daemon application 108 comprising software for listening on a port or communication line 110 coupled to a remote client (not shown) operating on behalf of a user. Daemon application 108 accepts as input over port 110 a request 112 containing a user name 114, a password 116, and an identifier 118 specifying a task (step 120).

User name (or login name) 114 is an alphanumeric string uniquely associated with the user and used by him to identify himself to the system 100. A security database 134 associated with the system 100 stores, in a record 136 for each user name 114, an integer user ID uniquely associated with the user name, an integer group ID associated with the user name, and a list of any supplementary groups associated with the user name, as well as the user's password and other pertinent information. To authenticate the user, daemon application 108 accesses the record 136 in security database 134 corresponding to the specified user name 114 and checks the password in that record. If a record 136 exists for the specified user name 114 and the password in the record matches the password 118 accompanying the request, then the requester is authenticated as being the user he purports to be, having user name 114.

After daemon application 108 has verified the user name 114 and authenticated the password 116, it must ready a new environment to run a new program image that will perform the requested task. To do this, daemon application 108 issues a fork(( system call to the kernel layer 104 to create a new process (step 122).

The fork() system call triggers a kernel fork routine 124 in the kernel layer 104 to get control. Upon getting control, fork routine 124 creates and initializes a new address space 106 (step 126), and copies storage, security and process execution attributes from the daemon layer 102 to the user task process layer 106 (step 128).

Upon successful completion, fork() routine 124 causes process layer 102 with daemon application 108 to become the parent of the newly created child process layer 106 with daemon application 130. Indicators are returned from the fork() routine 124 telling the daemon applications 108 and 130 which process layers they are running in. If in the parent process layer 102, then the daemon application 108 in that layer loops back to wait for more work from port 110 (step 129).

If in the child layer 106, then the daemon application 114 in that layer establishes the security attributes for the user name 114 specified in the request.

Several POSIX functions are invoked to establish the correct supplementary groups, group ID and user ID for the child layer 106. These calls access the data in the security database 134 for the requesting user. More particularly, the child daemon application 130 first issues a getpwnam() call to access security database 134 to determine the user ID and group ID corresponding to user name 114 (step 132). Application 130 then issues a getgroups() call to access security database 134 to determine the supplementary groups corresponding to user name 114 (step 138).

With this information, the child daemon application 130 then issues a setgroups() call to set the supplementary groups for the child layer 106 to the supplementary groups corresponding to user name 114 (step 140), issues a setgid() call to set the group ID for the child layer 106 to the group ID corresponding to user name 114 (step 142), and issues a setuid() call to set the user ID for the child layer 106 to the user ID corresponding to user name (step 144).

Once the correct POSIX security environment is established for the new user in the manner described above, the daemon application 114 issues an exec() system call, with the specified user task identifier 118 as a parameter (step 146). This function causes a kernel exec routine 148 to reinitialize the address space 106, clearing storage and establishing the correct process security and execution environment (step 150), before giving control to the new user task program 154 (step 152).

On many POSIX-compliant systems, including the IBM OS/390 operating system with its OpenEdition extension, there is a severe performance penalty for the excessive calls made to the security database to change the user identity in user processes. Also, with this conventional method, a daemon can not make use of the POSIX spawn() service and therefore must provide a portion of daemon application to run in the child process.

Figure 2:
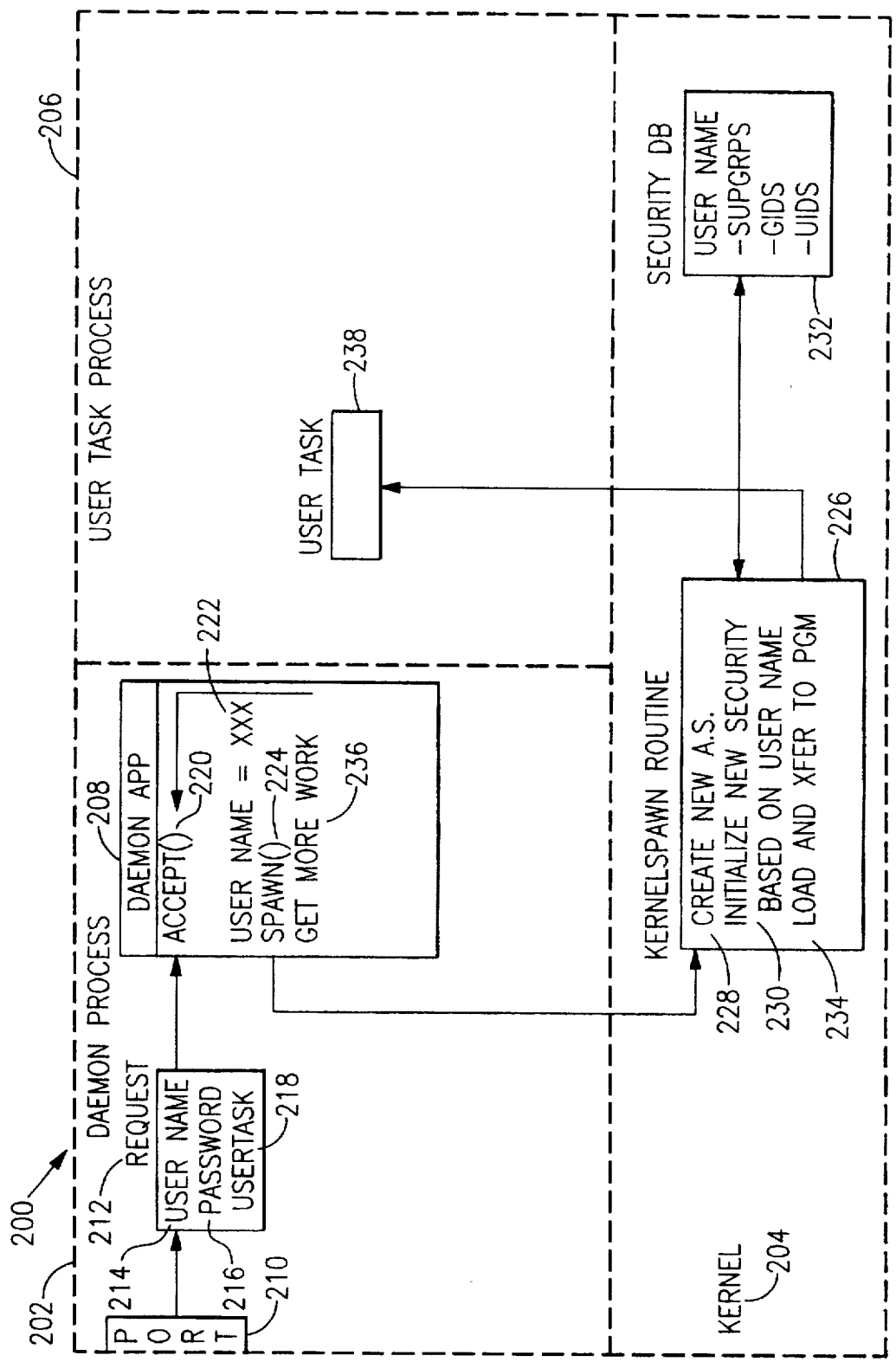
FIG. 2 shows a computer system using incorporating the present invention for creating a security environment for a user-requested task.

FIG. 2 is an example of a computer system 200 (comprising a physical machine) incorporating the present invention, showing the relationship between the various software layers for performing a requested task for a specific user ID. These layers include a daemon process layer or address space 202, an operating system (OS) or kernel layer or address space 204, and (when created) a user task process layer or address space 206.

In the daemon process layer 202 is a daemon application 208 comprising software for listening on a port or communication line 210 coupled to a remote client (not shown). Daemon application 208 accepts as input over port 210 a client request 212 comprising a user ID 214, a password 216, and an identifier 218 of a specific task to perform (step 220).

After daemon application 208 has verified the user ID 214 and authenticated the password 216, it readies a new environment to run a new program image that will perform the requested task. To do this, daemon application 208 first sets an environment variable USERNAME to the user name 214 of the request 212 being handled (step 222). Daemon application 208 then issues a spawn() system call to the kernel layer 204 to create a new process (step 224). The spawn() system call passes the task identifier 218 as a parameter and the user name 214 as the environment variable USERNAME. Daemon application 208 then loops back to the beginning of the routine to get more work (step 236).

The spawn() system call (step 224) causes a kernel spawn routine 226 in the kernel layer 204 to get control. Upon getting control, spawn routine 226 first creates a new user task process layer or address space 206 (step 228).

Spawn routine 226 then queries a security database 232 in kernel layer 204 to obtain the necessary POSIX permission settings (step 230). The new address space 206 is then initialized directly with the correct security permissions, i.e., with the user ID and group ID of the new address space 206 being set equal to the group ID and user ID associated in the database 232 with user name 214 (as specified in the environment variable USERNAME).

Finally, kernel spawn routine 226 loads into address space 206 a program image 238 corresponding to the user task 218 specified in request 212 (and passed as a parameter by the daemon application 208), and transfers control to the program image to execute the user task (step 234).

To prevent its misuse by a remote user, usage of the new environment variable USERNAME should be restricted to authorized users. The privileges required to use this function should be equivalent to the setuid() function. If (as is usually the case for daemon applications) the daemon application 208 is operating as a superuser (user ID=0) with unlimited access rights, then it will have the required authority.

As noted above, the present invention provides a method of creating a security environment for a user task process without any required changes to the daemon process environment and without requiring any portion of the daemon application to run in the user task process. The present invention also allows the spawn() function to replace the conventional fork() and exec() functions, thereby gaining the simplification and performance enhancements inherently provided by the spawn() function.

Various modifications will be apparent to those skilled in the art. Thus, while the invention has been described in the context of UNIX-based systems and, more particularly, POSIX-compliant systems, it will be apparent that the invention could be used in other systems as well.

What is claimed is:

1. In a server system in which a daemon process listens for a request from a user to execute a specified user task, said request specifying an identity for said user, said system having an operating system kernel, a method for executing said task on behalf of said user with an appropriate security environment for said user, comprising the steps of:

(a) having said daemon process, upon receiving said request from said user:
      (1) set an environment variable in accordance with said identity specified in said request; and
      (2) issue a system call to said operating system kernel to execute said specified user task in a new address space; and
   (b) having said operating system kernel, upon receiving said system call from said daemon process:
      (1) create a new address space for said specified user task;
      (2) create a security environment for said specified user task in accordance with said environment variable; and
      (3) start said specified user task in said new address space.

2. The method of claim 1 in which said operating system kernel is a POSIX-compliant operating system kernel.

3. The method of claim 1 in which said system call is a spawn() system call.

4. The method of claim 1 in which said user has a user name, said identity comprising said user name.

5. The method of claim 4 in which said environment variable is set equal to said user name.

6. The method of claim 5 in which said new address space and said user name each have a user ID associated therewith, said step (b)(2) of creating said security environment comprising the step of:

setting the user ID of said new address space equal to the user ID of the user name specified by said environment variable.

7. The method of claim 6 in which the user ID of said user name is determined by accessing a security database.

8. The method of claim 5 in which said new address space and said user name each have a group ID associated therewith, said step (b)(2) of creating said security environment comprising the step of:

setting the group ID of said new address space equal to the group ID of the user name specified by said environment variable.

9. In a server system in which a daemon process listens for a request from a user to execute a specified user task, said request specifying an identity for said user, said system having an operating system kernel, apparatus for executing said task on behalf of said user with an appropriate security environment for said user, comprising:

(a) means associated with said daemon process, responsive to receiving said request from said user, for:
      (1) setting an environment variable in accordance with said identity specified in said request; and
      (2) issuing a system call to said operating system kernel to execute said specified user task in a new address space; and
   (b) means associated with said operating system kernel, responsive to receiving said system call from said daemon process, for:
      (1) creating a new address space for said specified user task;
      (2) creating a security environment for said specified user task in accordance with said environment variable; and
      (3) starting said specified user task in said new address space.

10. The apparatus of claim 9 in which said operating system kernel is a POSIX-compliant operating system kernel.

11. The apparatus of claim 9 in which said system call is a spawn() system call.

12. The apparatus of claim 9 in which said user has a user name, said identity comprising said user name.

13. The apparatus of claim 12 in which said environment variable is set equal to said user name.

14. The apparatus of claim 13 in which said new address space and said user name each have a user ID associated therewith, said means (b)(2) for creating said security environment comprising:

means for setting the user ID of said new address space equal to the user ID of the user name specified by said environment variable.

15. The apparatus of claim 14 in which the user ID of said user name is determined by accessing a security database.

16. The apparatus of claim 13 in which said new address space and said user name each have a group ID associated therewith, said step (b)(2) of creating said security environment comprising the step of:

setting the group ID of said new address space equal to the group ID of the user name specified by said environment variable.

17. A program storage device readable by a machine, tangibly embodying a program of instructions executable by the machine to perform method steps for executing a task on behalf of a user with an appropriate security environment for said user in a server system in which a daemon process listens for a request from a user to execute a specified user task, said request specifying an identity for said user, said system having an operating system kernel, said method steps comprising:

(a) having said daemon process, upon receiving said request from said user:
      (1) set an environment variable in accordance with said identity specified in said request; and
      (2) issue a system call to said operating system kernel to execute said specified user task in a new address space; and (b) having said operating system kernel, upon receiving said system call from said daemon process:
      (1) create a new address space for said specified user task;
      (2) create a security environment for said specified user task in accordance with said environment variable; and
      (3) start said specified user task in said new address space.

18. The program storage device of claim 17 in which said operating system kernel is a POSIX-compliant operating system kernel.

19. The program storage device of claim 17 in which said system call is a spawn() system call.

20. The program storage device of claim 17 in which said user has a user ID, said identity comprising said user ID.

21. The program storage device of claim 20 in which said environment variable is set equal to said user ID.

22. The program storage device of claim 21 in which said new address space and said user name each have a user ID associated therewith, said step (b)(2) of creating said security environment comprising the step of:

setting the user ID of said new address space equal to the user ID of the user name specified by said environment variable.

23. The program storage device of claim 22 in which the user ID of said user name is determined by accessing a security database.

24. The program storage device of claim 21 in which said new address space and said user name each have a group ID associated therewith, said step (b)(2) of creating said security environment comprising the step of:

setting the group ID of said new address space equal to the group ID of the user name specified by said environment variable.

* * * * *